June 18, 1968 L. BALAMUTH ET AL 3,389,218
ULTRASONIC FACSIMILE SYSTEM
Filed Dec. 23, 1963 5 Sheets-Sheet 1
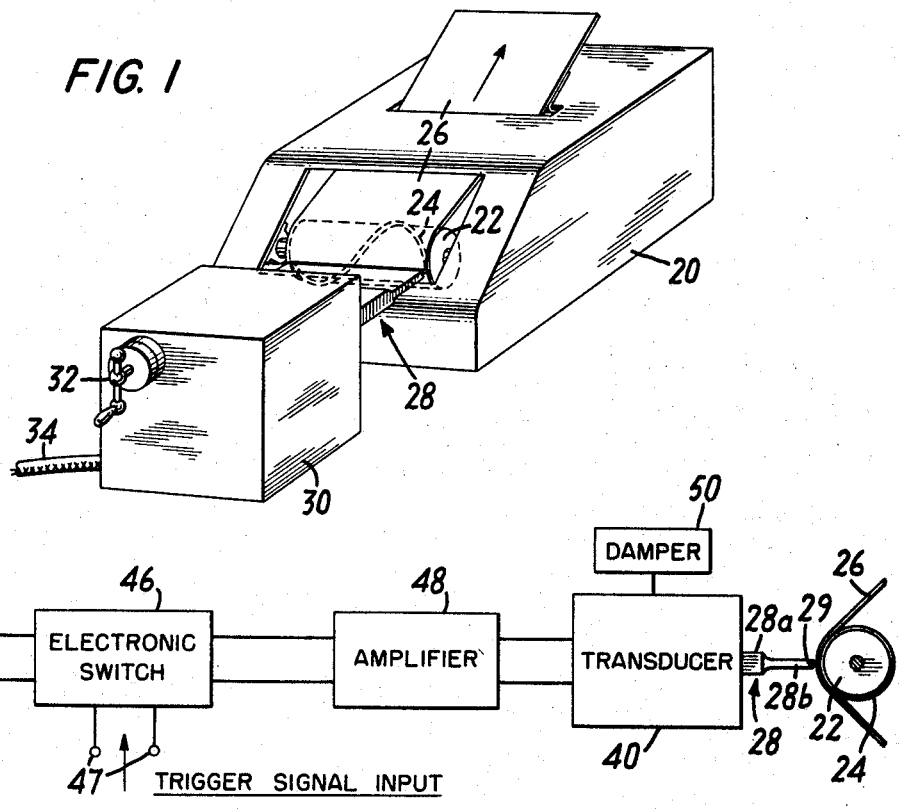
FIG. 1
FIG. 2
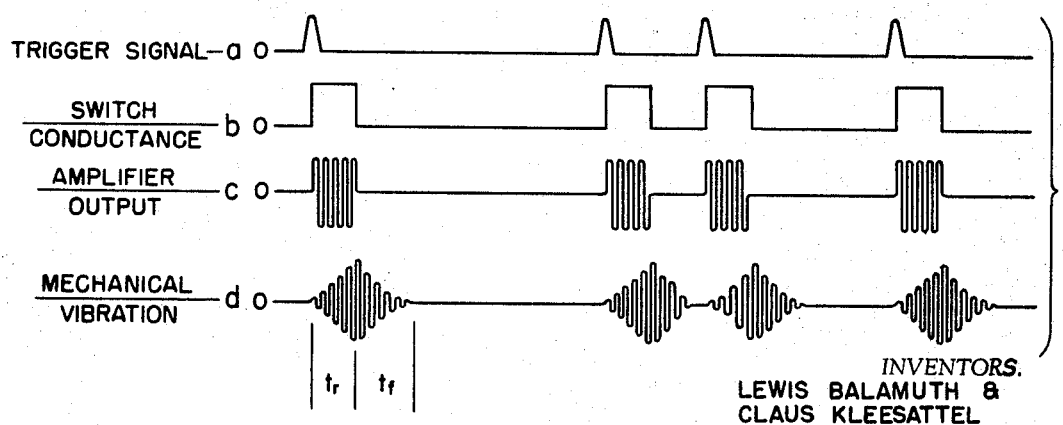
FIG. 3
INVENTORS.
LEWIS BALAMUTH &
CLAUS KLEESATTEL
BY Brumbaugh, Free, Graves & Donohue
their ATTORNEYS.

INVENTORS.
LEWIS BALAMUTH &
CLAUS KLEESATTEL
BY
their ATTORNEYS.

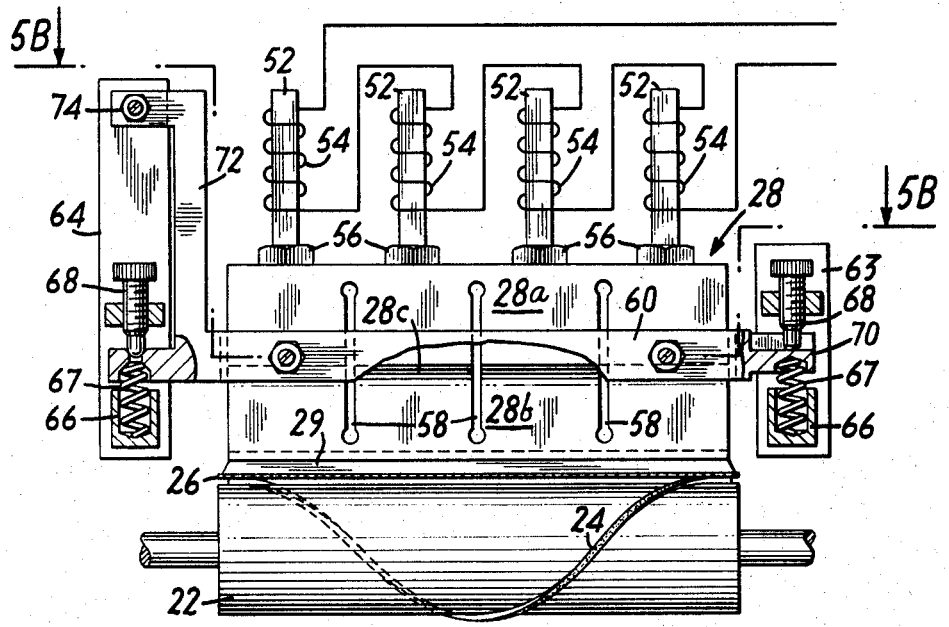
FIG. 5A
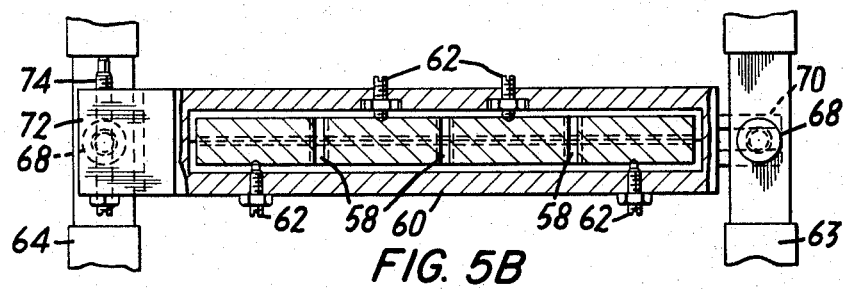
FIG. 5B
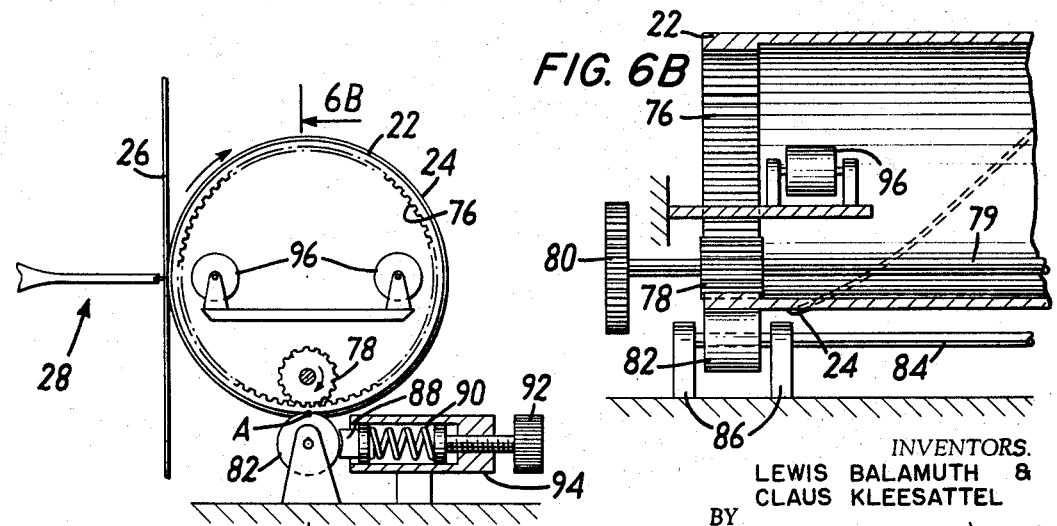
FIG. 6A
FIG. 6B
INVENTORS.
LEWIS BALAMUTH &
CLAUS KLEESATTEL
BY
Brumbaugh, Free, Graves & Donohue
their ATTORNEYS.

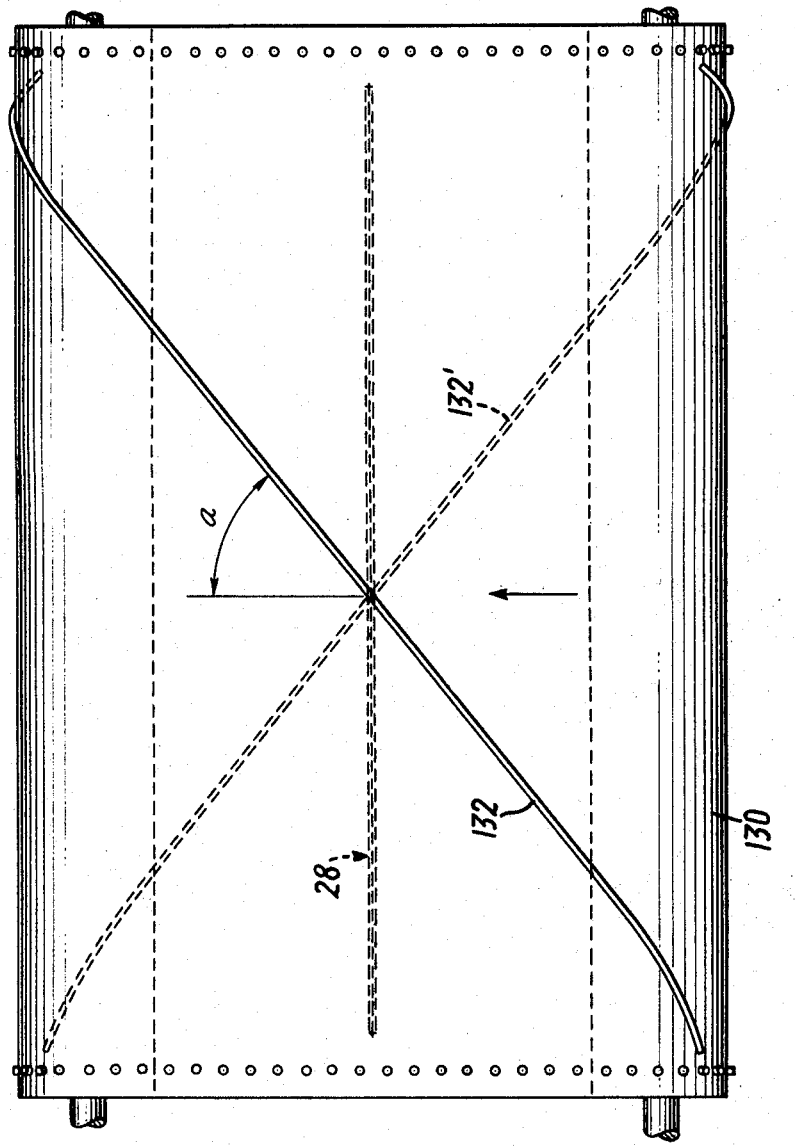
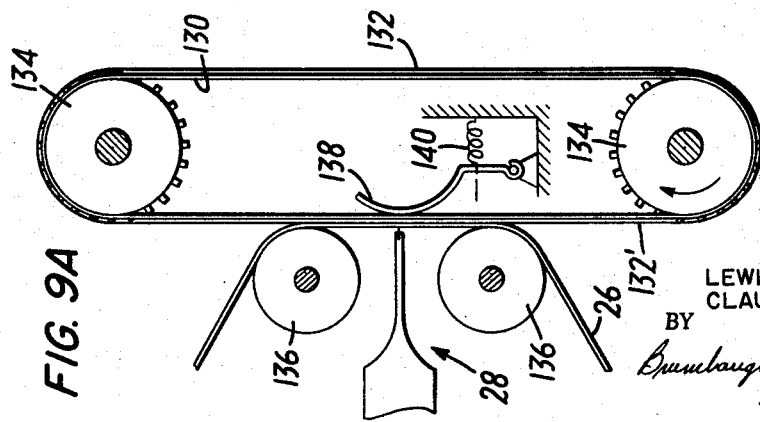
FIG. 9B
FIG. 9A
INVENTORS.
LEWIS BALAMUTH &
CLAUS KLEESATTEL
their ATTORNEYS.

ULTRASONIC FACSIMILE SYSTEM
Lewis Balamuth, New York, and Claus Kleesattel, Forest Hills, N.Y., assignors to Cavitron Ultrasonics Inc., Long Island City, N.Y., a corporation of New York
Filed Dec. 23, 1963, Ser. No. 332,560
12 Claims. (Cl. 178—6.6)

This invention relates to facsimile apparatus, and more particularly to an improved form of facsimile reproducing equipment employing ultrasonics to enhance the quality and increase the speed of operation.

Conventional facsimile reproducing equipment consists generally of three principal components: the scanning mechanism, the printing or pressure blade and the pressure sensitive recording medium or paper.

The scanning mechanism usually comprises a drum provided with a helical ridge of wire or the like on its outer surface. The drum rotates about its axis at a constant speed and the helical ridge effects a scanning action along its length. The recording medium, which may be separate layers of white paper and carbon paper, or any of several different forms of pressure sensitive sheet, is moved across the rotating cylinder so that the helical ridge thereon scans across the paper from edge to edge. The longitudinal speed of the paper is made relatively slow with respect to the rotation of the drum so that during each scan across the paper, it advances but a small fraction of an inch.

The printing or pressure blade is of a length substantially equal to the length of the scanning drum and arranged parallel to the axis thereof in close proximity to the outer surface of the recording medium. In conventional systems, the printing blade is actuated in response to electrical signals representative of the information to be reproduced to exert pressure against the paper, which in conjunction with the elemental portion of the helix then in alignment with the printing blade, causes the production of a dot or mark on the paper. The facsimile reproduction is then built up of a large number of such marks spaced in accordance with the electrical signals to generate the image.

In order that the facsimile reproduction be of suitable quality and clarity, it is necessary that there be assurance that each time the printing blade is actuated, a mark is produced on the paper. The small eccentricities or other material inaccuracies inherent in the mechanical nature of the equipment would result in "out of contact" or white spots on the paper if all of the elements were rigid. To permit the paper to remain in firm contact with the printing blade or scanning helix at all times, so as to avoid these difficulties, one or more of the components of the facsimile apparatus must be compliant. Since papers with sufficient compressibility are not made (and if they were available they would provide very poor contrast and picture resolution) the compliance or resiliency has to be provided either in the printing blade or the scanning mechanism, or in both.

In known facsimile systems, the scanning mechanism is rigid, consisting generally of a metal cylinder with the helix formed of a steel wire mounted on its outer surface. The necessary compliance is provided in the support for the printing blade, which may comprise springs, the forces of a D.C. magnetic field, or simply means to utilize the force of gravity. The same means provides a constant initial force which maintains the printing blade in permanent contact with the paper and against the scanning helix. Although the initial force, or preload, serves to eliminate the possibility of "white spots," it also results in a certain amount of printing, caused in background on the paper of a density determined by the value of the initial pressure.

While the above described prior art systems operate with some degree of satisfaction, they have an important drawback which severly limits their usefulness, and that is a relatively slow speed of operation. To obtain good picture quality with existing equipment, it must be operated at a rate of one scan per second. However, it has been determined that to be economically practical for wide usage, the equipment should operate at a rate of six scans per second. The result has been that a compromise has been struck between quality of product and economy of operation.

The principal speed limiting factors in existing facsimile equipment are the high mechanical inertia of the printing blade and its mounting means, and the high electrical inertia of the magnetic system for actuating the printing blade. Both arise from the necessity of moving a relatively large printing blade of high mass against the paper with sufficient pressure to produce the imprint. Movement of such a large mass, with its high mechanical inertia, must be effected by a magnetic system using high levels of magnetic field energy. The time constants, or $L/R$ ratios, of these magnetic systems are relatively high, and the appreciable length of time necessary for current flow through the coil to generate the requisite magnetic field strength may be considered the electrical inertia of the system.

In addition to mechanical and electrical inertia, known facsimile reproduction systems are also subject to low frequency mechanical resonances that may interfere with the quality of the printing and produce image density variations which are undesirable. It is extremely difficult to attenuate or damp these low frequency resonances since a number of resonance modes are involved. Moreover, any extensive damping of the mechanical elements will necessarily be detrimental to the speed of the printing process itself.

Accordingly, it is the principal object of the present invention to provide a facsimile reproducing system which avoids the shortcomings of prior art systems and produces a higher quality finished product at greater speeds than heretofore possible.

A further object of the present invention is to provide an improved facsimile reproducing system utilizing ultrasonic energy to produce the impression, whereby higher printing speeds are obtainable.

Yet another object of the present invention is to provide electrical actuating means for an ultrasonically driven printing blade in a facsimile system whereby electrical inertia effects are maintained at a minimum.

An additional object of the present invention is to provide an improved scanning drum for a facsimile system in which the drum or helical ridge thereon provides the compliance necessary to operation of the facsimile equipment.

Briefly, the system of the present invention includes the three basic elements of conventional facsimile systems with, however, notable distinctions therefrom. The printing blade is rigidly mounted with respect to the scanning drum and is driven by an electro-mechanical transducer operating at ultrasonic frequencies, for example, in the range from 15 to 60 kilocycles per second. The blade is normally held against the paper or record sheet with a small static force and, in the absence of printing signals, either is not vibrated or is vibrated at a minute amplitude. Upon receipt of a signal indicative of a dot to be printed, the transducer is caused to vibrate with a relatively large amplitude at the selected ultrasonic frequency for a predetermined period of time. During each cycle of vibration, the printing blade exerts a force against the paper which is a large multiple of the static contact force. A large number of such contacts occur during the printing of a single dot, but because of the high frequency of the vibration, they merge to form a single, sharp impression.

Since the printing blade is rigidly mounted, the compliance necessary to the system is provided in the scanning structure. The scanning surface, the helical element, or the means by which the helix is mounted on the scanning drum may be made resilient. This resiliency, in conjunction with the initial positioning of the rigidly mounted printing blade, also provides for the establishment of the static contact force required to avoid "white spots." The helix is provided with a hard contact surface and a high mechanical impedance per unit length at the ultrasonic operating frequency of the system to provide a maximum dynamic stiffness. At the same time, damping means are provided to minimize low frequency (e.g. 3 to 6 c.p.s.) effects introduced by the scanning mechanism. Accordingly, self resonances which would interfere with the printing process are avoided.

The transducer which drives the printing blade is actuated by an alternating current signal of the desired ultrasonic frequency which is in turn controlled by the source of intelligence signals. The latter arrive in the form of relatively narrow pulses, each of which gates a burst of oscillations from the generator to the transducer. The latter then vibrates to produce an imprint on the paper for each burst of applied oscillations. The transducer is provided with suitable damping means to permit rapid return of the printing blade to its initial state at the termination of a pulse.

The foregoing, and other features, objects and advantages of the present invention will become more readily apparent from the following more detailed description thereof, when read in conjunction with the accompanying drawings in which:

FIGURE 1 is a pictorial representation of a facsimile reproducing system according to the invention;

FIGURE 2 is a block diagram illustrating the electrical components of the system of the invention;

FIGURE 3 is a series of wave forms explaining the operation of the apparatus of FIGURE 2;

FIGURES 5A and 5B are respectively plan and sectional views of one form of mounting means for the pressure blade;

FIGURES 6A and 6B are respectively end and partial sectional views of one form of scanning drum mounting means;

FIGURES 9A and 9B are respectively end and front elevation views of a different form of scanning apparatus.

Figure 4A:
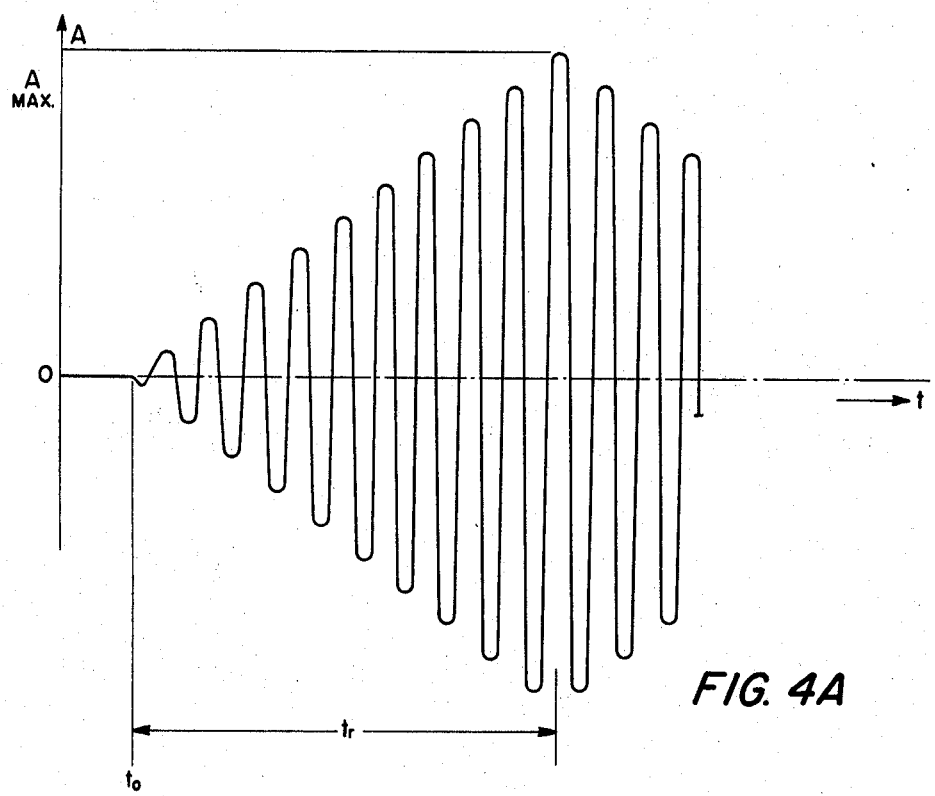
FIGURES 4A and 4B are wave form diagrams useful in explaining the operation of the pressure blade of the invention.

Referring now to FIGURE 1, the basic components of the facsimile reproducing system are shown in pictorial form. A housing 20 partially encloses a scanning drum 22 adapted to be rotated by a suitable motor drive (not shown). On the outer peripheral surface of the drum 22 is formed a raised helical ridge 24. A web of paper or other recording medium 26 in sheet form is fed from a supply roll interiorly of the housing by suitable drive means (not shown), over the scanning drum and through a suitable opening provided in the top of the housing 20. The surface of the record sheet 26 facing the scanning drum is maintained continuously in contact with a portion of the helical ridge 24.

The record sheet 26 may be formed of any material responsive to pressure to provide an imprint. It may be a single sheet of pressure-sensitive paper such as are now available, which provide a visible imprint in response to the application of pressure, or it may be formed of separate sheets of plain and carbon paper fed from separate rolls. Alternatively, it may be formed of other materials such as Mylar film, aluminum foil, or other thin flexible sheets capable of responding to applications of pressure to provide an interpretable imprint.

The pressure blade, the third basic element of the system, is shown generally at 28 and is seen to comprise a blade-like element having a relatively narrow contact edge disposed generally parallel to the axis of the scanning drum 22 and spanning the entire length thereof. The blade is mounted within a housing 30 which also includes transducer means responsive to electrical oscillations to impart a mechanical vibration to the blade 28 at an ultrasonic frequency and in a direction substantially radial of the scanning drum 22. A means for adjusting the position of the pressure blade with respect to the scanning drum and record sheet is provided within the housing 30 under control of a manually actuated adjusting handle 32. Electrical signals for actuating the transducer are coupled thereto by means of a cable 34.

In operation, the speed of advance of the record sheet 26 and the scanning speed provided by the rotation of the drum 24 are selected in accordance with the desired quality of reproduction. For example, to obtain six scans per second, a rotational speed of the drum 24 of 360 r.p.m. is provided. With the record sheet advancing at a rate of one inch per minute, a longitudinal resolution of 360 lines per inch on the finished copy is achieved. Desirably, the resolution in the lateral direction, i.e. across the record sheet, should be of the same magnitude or greater. With prior art facsimile systems, however, it has not been possible to obtain lateral resolution of this magnitude because of the mechanical and electrical inertia effects inherent in the equipment, without considerably reducing the scanning speed. This in turn lowers the speed of reproduction which is measured in picture area printed per second. The low inertia of the present system enables the same high longitudinal and lateral resolutions to be achieved at three or more times the printing speed of existing systems, or conversely, higher resolutions to be achieved at speeds normally used in existing systems.

FIGURE 2 illustrates in block diagram form the electrical circuitry for driving the pressure blade 28. The latter may be a blade-like element, of a low density solid material such as aluminum, magnesium, or a hard plastic, and preferably is formed to act as vibration amplitude transformer, having a certain magnification rate. Thus the cross section of the blade includes an inner portion 28a of relatively large thickness and mass, and an output section 28b thinner than the inner section and of lower mass. As described in Balamuth et al. Patent No. Re. 25,033, granted Aug. 29, 1961, for "Vibratory Machine Tool and Vibratory Abrasion Method," and assigned to the present assignee, the mass differential between the inner and outer ends of the vibrating element increases the amplitude of the vibration appearing at the outer edge 29 with respect to that applied to its inner edge by the transducer.

The contact edge 29 of the pressure blade is shown as being formed of a very thin strip of hard material, such as titanium metal, thereby enabling very fine dots to be produced on the record sheet. The entire pressure blade 28 is disposed with its plane generally radially of the scanning drum 22 and the record sheet 26 is held between the blade edge 29 and the helical ridge 24 under a static contact force, as will be described in detail hereinafter.

The transducer 40, which converts electrical oscillations into mechanical vibrations, may be of any suitable magnetostrictive or piezoelectric type. In the case of the former, the electrical oscillations are fed to a coil disposed in magnetic coupling relationship to an elongated stack of plates of magnetostrictive material. As the magnetic field varies in accordance with the electrical oscillations, the magnetostrictive plates alternately elongate and contact in synchronism. All of the plates are bonded together and rigidly fastened at one end to the inner end 28a of the blade element, thereby coupling the mechanical vibrations to the blade.

In accordance with the teaching of the aforementioned Balamuth et al. patent, the lengths of the magnetostrictive stack and the pressure blade preferably are chosen to be approximately an integral number of half wave lengths at the driving frequency in the material. Conveniently, the pressure blade is made one half wave length long and the transition region between the inner section 28a and outer section 28b of the pressure blade is then provided at the quarter wave or nodal point of the blade. A suitable type of transducer structure is illustrated in U.S. Patent No. 3,113,225, granted Dec. 3, 1963 for "Ultrasonically Vibrated Members" in the name of Claus Kleesattel et al., and assigned to the present assignee, although other types may be used.

The transducer 40 is supplied with electrical oscillations generated by oscillator 42. Any suitable form of oscillator circuit, either of the vacuum tube or transistor type, may be used so long as it is capable of operating in the ultrasonic range, e.g., between approximately 15 and 60 kilocycles per second. A tuning control 44 is provided thereon to adjust to the desired frequency, which preferably is the longitudinal resonance frequency of the transducer-blade assembly. The oscillator output from 42 is coupled via an electronic switch 46, actuated in response to a trigger signal applied to its terminals 47, and thence through an amplifier 48 to the transducer 40. For reasons which will be explained hereinafter, the transducer 40 is provided with a damping means 50, which may be either electrical or mechanical in nature. As is well known, any loading of a vibrating body will damp its free oscillation and the damping means 50 may comprise simply a mass, preferably at least in part of an energy-absorbing material such as rubber, affixed to the vibrating blade.

The wave forms of FIGURE 3 are helpful in explaining the operation of the circuit of FIGURE 2. The trigger signals, curve a, are in the form of relatively short duration pulses, each one of which corresponds to an elemental area, or dot, of the material which is to be reproduced. Depending upon the scanning rate at the transmitting end, these pulses may occur at a frequency ranging from 1,000 cycles per second or less, to upwards of 4,400 cycles per second.

The trigger pulses are applied from the receiving equipment to the terminal 47 of the electronic switch 46, which may be any suitable gate circuit capable of opening for a predetermined period in response to each input pulse supplied thereto. Thus, as illustrated in curve b, each trigger pulse renders the electronic switch conductive for a preselected interval of time. For the duration of each of these periods, oscillations are conducted through the switch and to the amplifier 48, as indicated in curve c. The amplified bursts of electrical oscillations are then applied to the input of the transducer 40.

Curve d of FIGURE 3 represents the mechanical vibration induced in the pressure blade 28 and, correspondingly, the movement of the blade edge 29. As shown, the amplitude of vibration increases at a substantially linear rate during a rise time $t_r$ which is equal to the entire period of excitation of the transducer. The finite time buildup results from the small inertia inherent in the transducer and blade system. At the conclusion of the application of electrical energy, the vibration induced in the transducer and blade begins to decay and falls to zero within a time $t_f$. As indicated in curve d, the fall is generally exponential in nature and the damping means 50 insures that the fall time $t_f$ is such as to reduce the amplitude of vibration substantially to zero between successive pulses at the maximum pulse repetition frequency expected.

FIGURE 4A is an amplified portion of the mechanical vibration characteristic of the blade during a single period of operation. The rise time $t_r$ is equal to the duration of the rectangular pulse shown in curve b of FIGURE 3 and the number of oscillations produced during the rise time is equal to $t_r$ times the frequency of the applied electrical oscillations.

Figure 4B:
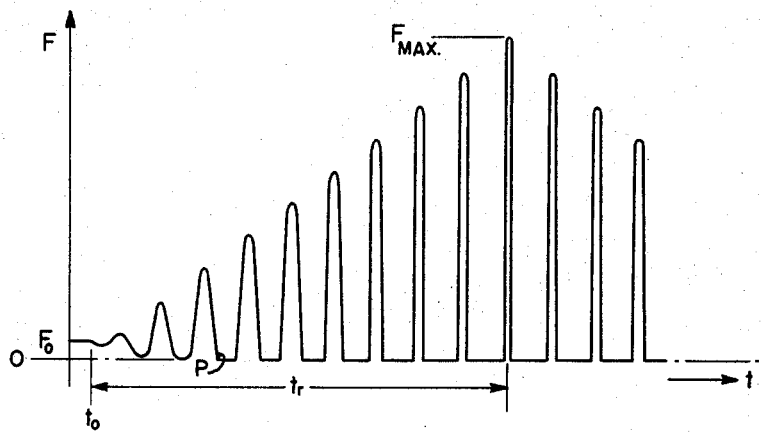

FIGURE 4B is drawn on the same time scale as FIGURE 4A and is a plot of the contact forces developed between the edge 29 of the printing blade and the record sheet 26. Prior to time $t_0$, the printing blade is not vibrating at all and a static force $F_0$ is applied to the record sheet. As the mechanical vibrations begin to build up, beginning at time $t_0$, the force applied against the paper by the blade begins to increase. For the first several cycles, contact between the record sheet and the blade edge is not lost, however, as the amplitude of vibration increases, a point P is reached at which contact with the paper is lost. Thereafter, the contact between the blade and the paper becomes intermittent with the actual contact time during each cycle decreasing as the amplitude of vibration increases. At the same time that the contact time decreases, the impact force applied during contact increases until at the maximum amplitude of vibration of the blade, a maximum force $F_{max}$ is developed.

With a transducer and blade structure of the type described hereinabove, the maximum or peak force may be ten or more times the static force $F_0$, depending upon the amplitude of vibration. It will be seen then that the ultrasonic vibration of the pressure blade produces a number of short duration impacts of relatively high force against the record sheet. The frequency of the contact is, however, so high that the individual imprints produced thereby merge to a single impression which, because of the high contact force, is of sharp contrast to the unimprinted portions of the record sheet. Furthermore, it will be noted that although the build-up time of the mechanical vibrations is finite, substantial impact forces are developed within a few cycles of vibration. At a frequency of 40 kilocycles per second, it would be merely a matter of 75 or 100 microseconds after receipt of the signal pulse before the printing action started, a delay considerably less than that encountered in conventional systems.

The relatively high values of the vibration frequency provided at the pressure blade practically eliminates the generation of low frequency vibrations that could cause undesirable resonances in the system. For example, if the frequency of excitation of the transducer is 40 kilocycles per second, and the pulse repetition frequency of the trigger pulse input is 4,000 cycles per second, the resultant amplitude modulation of the ultrasonic frequency does not produce any measurable frequency components in the audio frequency range to which the mechanical elements of the system are susceptible. The principal side band components will lie at 36 and 44 kilocycles per second respectively, and the remaining components will drop off rapidly in amplitude and be spaced at intervals of 4 kilocycles above and below the 40 kilocycle center frequency. Accordingly, the system of the invention effectively precludes the establishment of undesirable resonances in the mechanical elements of the reproducing system.

FIGURES 5A and 5B illustrate the basic elements of the facsimile reproducing system showing a suitable form of transducer and pressure blade structure in greater detail. As seen therein, the scanning drum 22 has the raised ridge 24 helically wound thereon so as to effect a single scan for each revolution of the drum. The pressure sensitive record sheet 26 is shown in cross-section between the ride 24 and the contact edge 29 of the pressure blade 28.

The pressure blade-transducer system may be generally of the form described in the aforementioned Patent No. 3,113,225. The pressure blade 28 includes an inner portion 28a of relatively large thickness and an outer or edge portion 28b considerably thinner than the portion 28a. A transition region 28c smoothly connects the sections 28b and 28a so as to minimize mechanical stress concentration in the transition region. As previously described, the change in mass between the input section 28a and output section 28b causes the member 28 to act as an acoustic impedance transformer, whereby mechanical vibrations supplied to its input edge appear with greater amplitude at the output edge 29.

For driving a pressure blade of considerable extent, such as shown in FIGURE 5, it is preferable to utilize a plurality of individual transducer units so as to insure sufficiently high alternating forces at the output edge. As shown in the drawing, four such transducer units may be utilized. Each consists of a magnetostrictive stack 52 about which is wound a magnetic coil 54. The stack 52 is rigidly affixed to the input edge of the pressure blade 28 by a suitable form of threaded fastener 56. All of the coils 54 are connected in series so as to be excited in phase and are coupled to the output terminals of the amplifier 48 of FIGURE 2. To keep the mechanical vibrations in the blade 28 uniform, a plurality of transverse slots 58 are provided therein, effectively dividing the blade into four equally sized units. The net effect of the slots 58 and the individual transducers is to produce uniform vibration of desired amplitude along the output edge 29 in a direction perpendicular to the plane of the record sheet 26.

The entire transducer and blade structure is rigidly mounted within a heavy frame member 60, in which the pressure blade is clamped by means of a plurality of set screws 62. Each of the latter includes a pointed end cooperating with a conical depression on the surface of the blade. The mounting is effected as close to the mid or nodal point of the pressure blade as is possible so as not to interfer with the resonance vibration of the blade 28. To support the entire transducer and pressure blade structure, a pair of side support plates 63, 64 are provided which are fastened to the frame of the apparatus. Each of these plates is provided with a housing 66 within which is received a compression spring 67. Also affixed to each of the plates 63, 64 is a threaded upright receiving an adjusting screw 68.

One end of the mounting frame 60 is provided with a short extension 70 having a bore on one side adapted to receive the compression spring 67 and a slot on the other side to receive the end of the adjusting screw 68 associated with the plate 63. To the other end of the frame 60 is fastened a U-shaped bracket 72, one arm of which is provided with a bore to receive the spring 67 and a circular depression to receive the end of the adjusting screw 68 associated with the mounting plate 64. The other arm of the bracket 72 is provided with a vertical bore which threadedly receives an adjustable support screw 74.

The parallelism of the blade edge 29 with the axis of the scanning drum 22 is adjusted by means of screws 68. In conjunction with the springs 67, these serve to maintain the entire transducer and blade structure in rigid positon. Adjustment of the adjusting screw 74 serves to slightly pivot the entire structure about its plane so as to insure that the vibratory motion of the blade is radial of the scanning drum.

Since the transducer-pressure blade assembly is maintained substantially rigid, the compliance necessary to the facsimile system is provided for in the scanning drum arrangement. This may be accomplished either by making the drum and its mounting compliant or by building compliance into the helical ridge itself. One form of structure for rendering the entire scanning drum sufficiently compliant is shown in FIGURES 6A and 6B. The hollow drum 22 is preferably very thin walled and of a very lightweight plastic provided with a helical ridge 24 on its outer surface. The ridge may be a steel wire, for example, molded in the plastic of the drum. The interior surface of the drum 22 at each end thereof is toothed to provide an internal gear 76. The drum is rotated by means of a pair of pinion gears 78 mounted on a shaft 79, the pinions engaging the internal gears 76 at each end of the drum and driven such as by a synchronous motor engaging the drive gear 80.

The drum is supported from beneath by a pair of rollers 82 journaled on a shaft 84 supported at each end by brackets 86. A friction shoe 88 is urged by means of compression spring 90 and adjusting screw 92 in the housing 94 against each of the support rollers 82 to supply a braking torque thereto. As a consequence, a counterclockwise moment is created around the point A, urging the drum in the direction of the printing blade 28 with a certain static force. In addition to creating the necessary static force against the record sheet 26, the moment provides the compliance necessary to the system. Two sets of space rollers 96, one set at each end of the drum, serve to prevent excessive displacement of the cylinder when the record sheet is being changed or during movement of the equipment.

Figure 7:
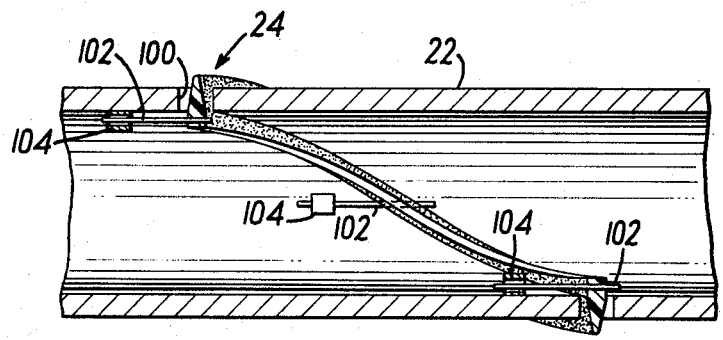
FIGURE 7 is a partial cross section through a scanning drum showing one form of compliant helical ridge.

As an alternative to making the entire drum compliant such as illustrated in FIGURES 6A and 6B, the drum itself may be rigidly mounted and the necessary compliance provided by the helical ridge itself. Such an arrangement is shown in FIGURE 7. The hollow scanning drum 22 is provided with a helical slot 100 extending completely therethrough. The helical element 24, which may be made of a hard plastic, a metal of good wear resistance, or any other high impact material, is disposed therein with its outer edge extending beyond the peripheral surface of the drum. The element 24 is supported by a plurality of spring elements 102, which may be made of spring steel, and which are in turn fastened to the interior surface of the drum by any suitable means 104, such as slotted members provided a degree of freedom in a direction radial of the drum. The stiffness of the spring elements 102 may be selected to provide the necessary degree of compliance for proper operation of the system. If necessary, damping means, such as foam rubber, may be added.

Figure 8A:
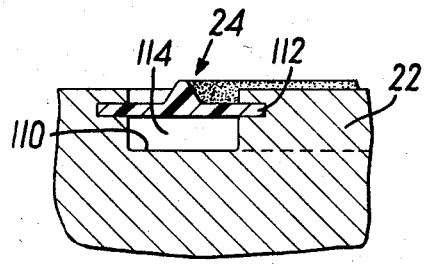
FIGURES 8A and 8D are partial cross sections through a scanning drum illustrating other forms of compliant helical ridges.

Other forms of resilient helices are illustrated in FIGURES 8A to 8D. In FIGURE 8A, a helical groove 110 is formed in the surface of the scanning drum 22 and a generally flat member 112 mounted therein, spanning the sides of the groove and leaving a hollow space 114 below it. A raised ridge on the upper side of the member 112 provides the helix 24. The element 112 may be made of plastic or rubber extruded to the shape shown and is mounted in the drum so as to hermetically seal off the space 114. The latter may be filled with a suitable medium, such as compressed air, the pressure of which may be varied to adjust the compliance of the helix.

Figure 8B:
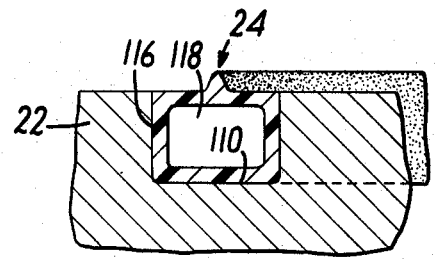

In FIGURE 8B, the element 116 is extruded in the form of a generally rectangular hollow tube, which substantially fills the helical groove 110. As in the case of FIGURE 8A, the hollow space 118 may be filled with compressed air or the like to adjust its compliance.

Figure 8C:
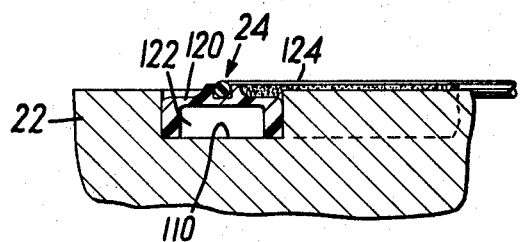
Figure 8D:
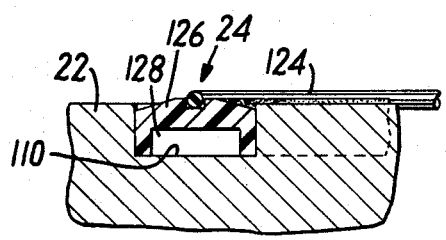

FIGURES 8C and 8D are substantially similar modifications comprising a U-shaped extrusion mounted in the helical groove 110 to provide sealed-off areas 122, 128, respectively. Hardened wires 124, such as of steel, are securely held in the upper surface of the extrusions to provide the raised helical ridge 24 on the periphery of the scanning cylinder. In the embodiment of FIGURE 8C, the extrusion is made relatively thin at its upper portion to provide somewhat more compliance than is obtainable with the heavier walled member 126 of FIGURE 8D.

Instead of the conventional scanning cylinder, the scanning surface may be provided in the form of an endless belt having a raised ridge on the outer surface thereof. Such an arrangement is shown in FIGURES 9A and 9B. As illustrated therein, an endless belt 130 is provided with a raised ridge 132 extending transversely across the belt on its outer surface. The ridge 132 is in the form of a straight line at an angle $\alpha$ to the direction of movement of the belt. The belt is supported on a pair of sprocket wheels 134, one of which may be driven to provide the necessary uniform motion of the belt.

The outer surface of the belt may have one or more raised ridge members 132, depending upon its length and the scanning speeds being used. As shown in the drawings, two ridges 132 and 132' are shown, it being realized that the end of one of the ridges is even with, laterally but spaced across the belt from the beginning of the next ridge. The ridges may be formed of hardened wires cemented or otherwise fastened to the surface of the belt or may be formed of the belt material itself. The latter may be a plastic film, a fabric or metal sheet, or other suitable material.

The record medium 26 is maintained against the ridge element 132 by a pair of rollers 136 between which the pressure blade 28 is mounted. The necessary compliance in the scanning surface is provided by a curved element 138, extending transversely of the belt substantially from edge to edge and urged against the inner surface of the belt by compression spring means 140.

It will be seen from the foregoing that the facsimile reproducing system of the present invention enables high quality facsimile reproduction at speeds greater than those obtainable with conventional equipment. By applying the contact force in the form of a large number of relatively short duration, high impact pulses, rather than in the form of a single impact, greater clarity and definition is obtainable. The use of ultrasonic energy to produce the impact forces also avoids the mechanical resonance problems often associated with ordinary apparatus of this type. Furthermore, the compliance necessary to the proper operation of the system is built into the scanning means rather than the printing bar or pressure blade as is done in prior art systems. Various forms of such scanning means are shown in which the scanning surface itself is compliant of the helical ridge is given the necessary resiliency.

In the foregoing embodiments, the static force urging the record sheet against the helix of the scanning drum results from the interaction of the compliant elements of the drum and the relatively rigid pressure blade. It will be recognized that other means may be provided for maintaining the record sheet against the helix under the necessary static pressure. For example, a magnetic record sheet may be used in conjunction with a magnetized drum. Alternatively, air pressure could be utilized with any type of record sheet by providing openings in the drum adjacent the helix and coupling the openings to a pressure below atmospheric. Both these techniques would be of particular advantage at very high printing speeds.

Although in the form of the invention described above, a magnetostrictive type of transducer is employed, it will be realized that suitable piezoelectric or other devices, capable of functioning in a similar manner, may be used instead.

As will be appreciated, various modifications of the apparatus shown above will occur to those skilled in the art. Although the arrangement described utilizes a record sheet of substantial width, with correspondingly dimensioned scanning means and pressure blade, the invention lends itself to facilitate reproduction of small size. Thus, the record sheet may be reduced to one or two inches in width, and the blade and scanning means similarly reduced in size and a good reproduction may still be obtained. This permits the overall structure to be made more compact and suitable for portable use.

Accordingly, the invention should be considered as limited only by the scope of the appended claims.

We claim:

1. In a facsimile reproducting system, a scanning drum having a raised helix extending radially outward from its peripheral surface, a record sheet maintained in contact with said raised helix, a pressure blade mounted adjacent said record sheet, and means coupled to said pressure blade and responsive to an electrical signal pulse to vibrate said pressure blade at a frequency in the ultrasonic range to urge said record sheet against said helix with substantial force thereby producing an imprint on said sheet, the compliance of said scanning drum and helix being greater than that of said pressure blade and mounting means.

2. A facsimile receiving system responsive to electrical pulse signals to produce an imprint on a record sheet comprising, a scanning drum having a raised helix on its outer peripheral surface, means for rotating said drum at a predetermined speed, means for moving said sheet at a constant speed past said drum with one surface thereof continually in contact with a portion of said helix, an elongated pressure blade disposed generally parallel to the axis of said drum, mounting means for said blade maintaining the edge thereof against the other surface of said sheet, said scanning drum and helix coacting with said blade to generate a static pressure force holding said sheet against said helix, and means responsive to each signal pulse to vibrate said pressure blade at an ultrasonic frequency for a predetermined time interval in a direction substantially radially of said scanning drum to cause increased contact forces to be applied against said record sheet and helix, thereby to produce an imprint on said sheet corresponding to each signal pulse.

3. The facsimile receiving system according to claim 2, wherein said scanning drum comprises a cylindrical member adapted to be rotated about its axis and includes a helical groove formed in the peripheral surface thereof, and wherein said raised helix is provided on the outer surface of resilient strip means mounted in and extending substantially the entire length of said groove, said strip means providing within said groove a sealed chamber substantially coextensive with said helical ridge, and variable pressure means within said chamber for controlling the compliance of said helical ridge.

4. A facsimile reproducing system comprising, a rotating scanning drum having a raised helical ridge extending radially outward from its outer peripheral surface, means for moving a record sheet past said drum at a substantially constant speed, an elongated pressure blade coacting with said drum and helical ridge for normally maintaining said record sheet against said helical ridge under a given static pressure, a source of electrical oscillations in the ultrasonic frequency range, a source of electrical signals representative of intelligence to be reproduced, transducer means coupled to said pressure blade to induce ultrasonic vibrations therein in response to electrical oscillation at an ultrasonic frequency, and means responsive to said electrical intelligence signals to couple said source of oscillations to said transducer, whereby the resultant ultrasonic vibration of said pressure blade provides increased pressure force against said record sheet to produce an imprint thereon.

5. A facsimile receiving system responsive to electrical pulse signals to produce an imprint on a record sheet comprising, a scanning drum having a raised helix on its outer peripheral surface, means for rotating said drum at a predetermined speed, means for moving said record sheet at a substantially constant speed past said drum with one surface thereof continually in contact with a portion of said helix, an elongated pressure blade disposed generally parallel to the axis of said drum, mounting means for said blade maintaining the edge thereof against the other surface of said sheet, said scanning drum and helix coacting with said blade to generate a static pressure force holding said sheet against said helix, a source of electrical oscillations in the ultrasonic frequency range, transducer means coupled to said pressure blade to induce ultrasonic vibrations therein in response to electrical oscillations at an ultrasonic frequency, and switch means coupling said source of oscillations to said transducer and responsive to each of said electrical pulse signals to apply said oscillations to said transducer for a predetermined period of time, whereby the resultant ultrasonic vibration of said pressure blade provides increased pressure forces against said record sheet to produce an imprint thereon.

6. A facsimile receiving system responsive to electrical pulse signals to produce an imprint on a record sheet comprising, a scanning drum having a resilient helical ridge extending radially outward from its outer peripheral surface, means for rotating said drum at a predetermined speed, means for moving said record sheet at a substantially constant speed past said drum with one surface thereof continually in contact with a portion of said helix, an elongated pressure blade disposed generally parallel to the axis of said drum, mounting means for said blade maintaining the edge thereof against the other surface of said sheet, said scanning drum and helix coacting with said blade to generate a static pressure force holding said sheet against said helix, a source of electrical oscillations in the ultrasonic frequency range, transducer means coupled to said pressure blade to induce ultrasonic vibrations therein in response to electrical oscillations at an ultrasonic frequency, switch means coupling said source of oscillations to said transducer and responsive to each of said electrical pulse signals to apply said oscillations to said transducer for a predetermined period of time, and damping means coupled to said transducer means to restore said transducer means to its non-actuated condition at the conclusion of each of said periods of time, whereby the resultant ultrasonic vibration of said pressure blade provides increased pressure forces against said record sheet to produce a single imprint during each of said periods of time.

7. A facsimile receiving system according to claim 6 wherein said switch means couples said oscillations to said transducer in response to each signal pulse for a period of time sufficient to enable a plurality of vibrations of said pressure blade.

8. A facsimile receiving system according to claim 7 wherein said ultrasonic frequency is at least 10 times the repetition frequency of said electrical pulse signals, whereby all of the significant sideband frequencies produced by the action of said switch means lie in the ultrasonic range.

9. A facsimile receiving system responsive to electrical signals to produce an imprint on a record sheet comprising, scanning means exhibiting a substantial degree of compliance, means for moving said record sheet at a substantially constant speed past said scanning means, a pressure blade, mounting means for positioning said blade to urge said record sheet into scanning contact with said scanning means, said pressure blade and mounting means exhibiting a substantially lower degree of compliance than said scanning means, a source of electrical oscillations in the ultrasonic frequency range, transducer means coupled to said pressure blade to induce ultrasonic vibrations therein in response to electrical oscillations at an ultrasonic frequency, and means responsive to said electrical signals to apply said oscillations to said transducer, whereby the resultant ultrasonic vibration of said pressure blade provides increased pressure forces against said record sheet to produce an imprint thereon.

10. For use in facsimile reproducing apparatus, a scanning drum comprising, a hollow cylindrical member adapted to be rotated about its axis, a helical slot formed in said member, a helical element disposed in said slot and extending radially from the outer surface of said cylinder, and a plurality of spring members spaced along said helical slot inside of said cylindrical member, each of said spring members fixed at one end to the interior surface of said cylindrical member and at the other end to said helical element to render said helical element compliant with respect to said cylindrical member.

11. For use with an elongated record medium moving along a given path in facsimile reproducing apparatus, scanning means comprising an endless belt presenting a continuous outer surface, sprocket means for moving said belt at a constant speed along a path parallel to at least a portion of the path of said record medium, a raised ridge extending transversely across that outer surface at a constant angle to the direction of motion of the surface, and resilient means mounted within and extending across the inner surface of said belt whereby said belt presents a compliant surface to forces applied thereto opposite said resilient means.

12. For use in facsimile reproducing apparatus, a scanning drum comprising a cylindrical member adapted to be rotated about its axis, a helical groove formed in the peripheral surface of said member, resilient strip means mounted in said groove having a raised portion on its outer surface extending substantially the entire length thereof to provide a helical ridge extending radially outward of the peripheral surface of said drum, said strip means providing within said groove an hermetically sealed chamber substantially coextensive with said helical ridge, and variable pressure means within said chamber for controlling the compliance of said helical ridge.

References Cited
UNITED STATES PATENTS

| | | | |
|---|---|---|---|
| 2,529,978 | 11/1950 | Thompson | 346—139 |
| 2,776,181 | 1/1957 | Alden | 346—138 |
| 3,138,427 | 6/1964 | Stein | 178—6.6 |
| 3,138,428 | 6/1964 | Kutik | 346—101 |
| 3,138,429 | 6/1964 | Cooley | 178—6.6 |
| 3,159,710 | 12/1964 | Sorgi | 178—6.6 |
| 2,962,340 | 11/1960 | Alden | 178—6.6 |
| 3,109,058 | 10/1963 | Luhn | 178—6.6 |
| 2,951,118 | 8/1960 | Shahbender | 346—139 |
| 2,312,317 | 3/1943 | Burcky | 346—139 |

ROBERT L. GRIFFIN, *Primary Examiner.*

DAVID G. REDINBAUGH, *Examiner.*

J. A. ORSINO, P. SPERBER, *Assistant Examiners.*